(12) United States Patent
Yamamoto et al.

(10) Patent No.: US 10,196,004 B2
(45) Date of Patent: Feb. 5, 2019

(54) DISPLAY DEVICE FOR SADDLE-TYPE VEHICLE, AND SADDLE-TYPE VEHICLE

(71) Applicant: KAWASAKI JUKOGYO KABUSHIKI KAISHA, Kobe-Shi, Hyogo (JP)

(72) Inventors: Tomo Yamamoto, Akashi (JP); Taro Iwamoto, Kakogawa (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 0 days.

(21) Appl. No.: 15/825,645

(22) Filed: Nov. 29, 2017

(65) Prior Publication Data

US 2018/0170277 A1     Jun. 21, 2018

(30) Foreign Application Priority Data

Dec. 21, 2016  (JP) .................................. 2016-247758

(51) Int. Cl.
| | |
|---|---|
| *B60R 11/02* | (2006.01) |
| *B62J 99/00* | (2009.01) |
| *B62K 3/00* | (2006.01) |
| *B62K 11/00* | (2006.01) |

(52) U.S. Cl.
CPC ........... *B60R 11/0229* (2013.01); *B62J 99/00* (2013.01); *B62K 3/00* (2013.01); *B62K 11/00* (2013.01); *B62J 2099/0033* (2013.01); *B62K 2207/00* (2013.01)

(58) Field of Classification Search
CPC .................... B60K 37/00; B60K 37/02; B60K 2350/1056–2350/1072
USPC ............... 340/461, 462, 438, 439; 701/1, 70
See application file for complete search history.

(56) References Cited

U.S. PATENT DOCUMENTS

| | | | |
|---|---|---|---|
| 6,157,890 A * | 12/2000 | Nakai ....................... | B62J 99/00 340/988 |
| 6,407,663 B1 * | 6/2002 | Huggett ................. | B60K 35/00 200/61.54 |
| 8,812,174 B2 | 8/2014 | Ohshima et al. | |
| 2010/0082249 A1 * | 4/2010 | Ando ................. | G01C 21/3632 701/431 |

(Continued)

FOREIGN PATENT DOCUMENTS

JP          5808187 B2     11/2015

*Primary Examiner* — Jack K Wang
(74) *Attorney, Agent, or Firm* — Burr & Brown, PLLC (57) ABSTRACT

A display device for a saddle-type vehicle includes a display-form change operation input device, a preset switching operation input device, and a vehicle-information display device. The display-form change operation input device receives an operation for changing a display form. The preset switching operation input device receives an operation for switching a display form to a preset screen set in advance. The vehicle-information display device displays information about a saddle-type vehicle to enable a driver to recognize the information. This display device sets a display form of the vehicle-information display device in accordance with an operation for changing a display form received via the display-form change operation input device, and switches the display form of the vehicle-information display device to the preset screen if an operation for switching a display form to the preset screen is received via the preset switching operation input device.

8 Claims, 8 Drawing Sheets

(56) References Cited

U.S. PATENT DOCUMENTS

2015/0298549 A1\* 10/2015 Tamura ................. B60K 35/00
                                                                           340/461
2017/0072796 A1\* 3/2017 Ding ..................... B60K 35/00

\* cited by examiner

| FIRST SWITCHING DISPLAY AREA | SECOND SWITCHING DISPLAY AREA | THIRD SWITCHING DISPLAY AREA |
|---|---|---|
| ODO | INSTANTANEOUS FUEL CONSUMPTION | WATER TEMPERATURE |
| TRIP A | AVERAGE FUEL CONSUMPTION | BOOST TEMPERATURE |
| TRIP B | POSSIBLE RANGE | BOOST PRESSURE |
| BANKING ANGLE | AVERAGE SPEED | |
| | TIME TRAVELED | |
| | BATTERY VOLTAGE | |
| | DATE | |

FIG. 8

| AREA | FIRST SWITCHING DISPLAY AREA | SECOND SWITCHING DISPLAY AREA | THIRD SWITCHING DISPLAY AREA |
|---|---|---|---|
| PRESET INFORMATION | ODO | INSTANTANEOUS FUEL CONSUMPTION | WATER TEMPERATURE |

DISPLAY DEVICE FOR SADDLE-TYPE VEHICLE, AND SADDLE-TYPE VEHICLE

BACKGROUND OF THE INVENTION

Field of the Invention

The present invention relates to a display device for saddle-type vehicles.

Description of the Background Art

A panel display section disclosed in Japanese Patent No. 5808187 includes a plurality of display regions. With each short press of a forward sequence regulating switch, display in a first display region relating to, for example, fuel consumption is sequentially switched from instantaneous fuel consumption, to average fuel consumption, to possible range, to battery voltage, and to outside temperature. A further short press of the forward sequence regulating switch from the state that displays outside temperature causes the display to return to display of instantaneous fuel consumption. Likewise, with each short press of a reverse sequence regulating switch, display in a fifth display region relating to, for example, distance traveled is sequentially switched from odometer (ODO), which is indicative of accumulated distance traveled and cannot be reset, to Trip A display and to Trip B display, which are indicative of distance traveled in a given area and can be reset. A further short press of the reverse sequence regulating switch from Trip B display causes the display to return to display of the odometer.

According to the technique disclosed in Japanese Patent No. 5808187, the display in the first display region is sequentially switched with each short press of the forward sequence regulating switch. Thus, many short presses of the forward sequence regulating switch may be necessary to return the display content of the first display region to the initial display of instantaneous fuel consumption. Similarly, many short presses of the reverse sequence regulating switch may be necessary to return the display content of the fifth display region to the initial display of odometer.

In particular, it is difficult for saddle-type vehicles to set a large operation screen, and there is a limit to the amount of content that can be displayed in a display part. Besides, many operations are necessary to change the content of display, and the operations become more complicated as the display content increases.

SUMMARY OF THE INVENTION

An object of the present invention is to enable changing a display form of a vehicle-information display device and to enable switching the display form to a preset screen by an operation that is as simple as possible.

A display device for a saddle-type vehicle according to an aspect includes a display-form change operation input device, a preset switching operation input device, and a vehicle-information display device. The display-form change operation input device receives an operation for changing a display form. The preset switching operation input device receives an operation for switching a display form to a preset screen that has been set in advance. The vehicle-information display device displays information about a saddle-type vehicle to enable a driver to recognize the information. A display form of the vehicle-information display device is set in accordance with an operation for changing a display form received via the display-form change operation input device, and if an operation for switching a display form to the preset screen is received via the preset switching operation input device while the display form of the vehicle-information display device has been set, the display form of the vehicle-information display device is switched to the preset screen.

According to the display device for a saddle-type vehicle, the display form of the vehicle-information display device can be set via the display-form change operation input device. After the display form of the vehicle-information display device has been set, the display form of the vehicle-information display device can be switched to a preset screen that has been set in advance by an operation that is as simple as possible, such as operating the preset switching operation input device different from the display-form change operation input device.

These and other objects, features, aspects and advantages of the present invention will become more apparent from the following detailed description of the present invention when taken in conjunction with the accompanying drawings.

DETAILED DESCRIPTION OF THE INVENTION

A display device for a saddle-type vehicle, and a saddle-type vehicle will now be described hereinafter. The following embodiment describes a motorcycle as an example of the saddle-type vehicle. The display device according to the present invention is also applicable to other saddle-type vehicles different from motorcycles, such as all-terrain vehicles (ATVs) and personal watercrafts.

Figure 1:
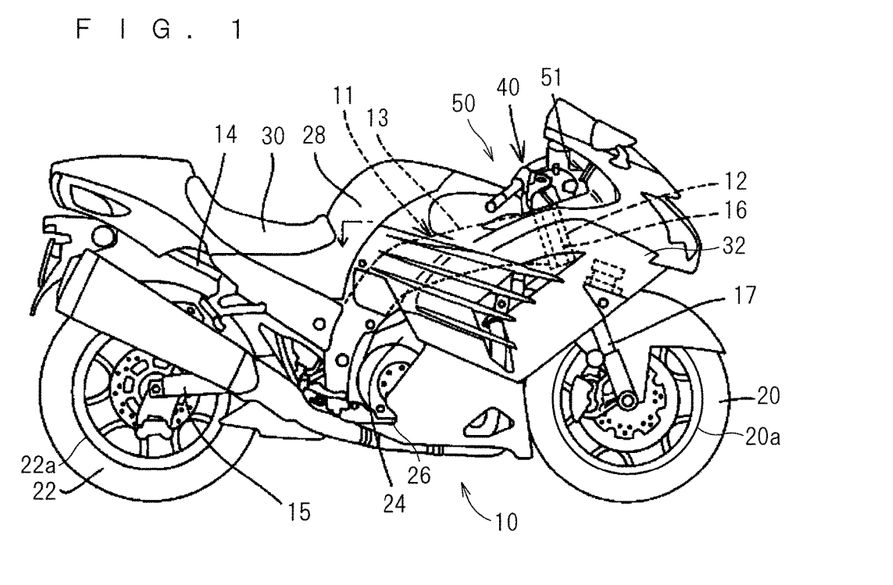
FIG. 1 is a side view of an overall configuration of a motorcycle.

FIG. 1 is a side view of an overall configuration of a motorcycle 10.

The motorcycle 10 includes a body frame 11, a front tire 20, a rear tire 22, a handle device 40, an engine 24, a transmission 26, and a display device 50. In the following description, up-and-down, back-and-forth, and right-and-left directions as referred to are each defined as follows. First, a side of the motorcycle 10 on which the front tire 20 and the rear tire 22 contact the road surface is referred to as a downward direction, and the opposite side of the motorcycle 10 is referred to as an upward direction. A direction in which the motorcycle 10 travels is referred to as a forward direction, and the opposite direction is referred to as a backward direction. With a user as a driver on the motorcycle, the right and left sides with respect to the user are referred to as right and left sides of the motorcycle 10.

The body frame 11 includes a head pipe 12, a main frame 13, and a rear frame 14.

The head pipe 12 is provided on the front side of the motorcycle 10. The main frame 13 separates into right and left at the head pipe 12 and extends backward. The rear frame 14 extends backward from the rear end of the main frame 13.

A steering shaft 16 rotatably passes through the head pipe 12. The steering shaft 16 supports an upper bracket 41 (see FIG. 2) and an under bracket (not shown). A front fork 17 is supported by the upper bracket 41 and the under bracket so as to extend downward. The front fork 17 is configured to be extendable and receives the impact on the vehicle from the road surface and a change in the load on the vehicle caused by acceleration and deceleration.

A front wheel 20a is rotatably supported at the lower end of the front fork 17 via an axle shaft. The front tire 20 is mounted on the front wheel 20a.

The front wheel 20a is equipped with a brake disc, and a brake caliper and brake pads are supported at the lower end of the front fork 17. The brake disc is sandwiched between the brake pads by the brake caliper, and a braking force is thereby generated.

The handle device 40 is mounted on the upper bracket 41 or the front fork 17. Operating the handle device 40 causes the steering shaft 16, the upper bracket 41, the under bracket, and the front fork 17 to rotate, and along with this rotation, the front wheel 20a and the front tire 20 described above also rotate. A display part 52 of a vehicle-information display device 51 is provided in a middle portion in a width direction of the handle device 40. The details of the handle device 40 and the vehicle-information display device 51 will be described later.

The engine 24, the transmission 26, and the like are attached to the lower side of the main frame 13, and a fuel tank 28 and the like are mounted on the upper side of the main frame 13.

The rear frame 14 is provided with a seat 30 on which the driver sits.

A swing arm 15 is attached to the rear portion of the main frame 13 so as to extend rearward and downward. The swing arm 15 is swingably supported by the main frame 13 so that its rear end shifts up and down. A rear wheel 22a is rotatably supported at the rear end of this swing arm 15 via an axle shaft. The rear tire 22 is mounted on the rear wheel 22a.

A brake disc is mounted on the rear wheel 22a, and a brake caliper and brake pads are supported at the rear end of the swing arm 15. The brake disc is sandwiched between the brake pads by the brake caliper, and a braking force is thereby generated.

The motorcycle 10 is provided with a cowl 32 that covers the front of the head pipe 12 and both sides of the main frame 13. The cowl 32 may be omitted.

Figure 2:
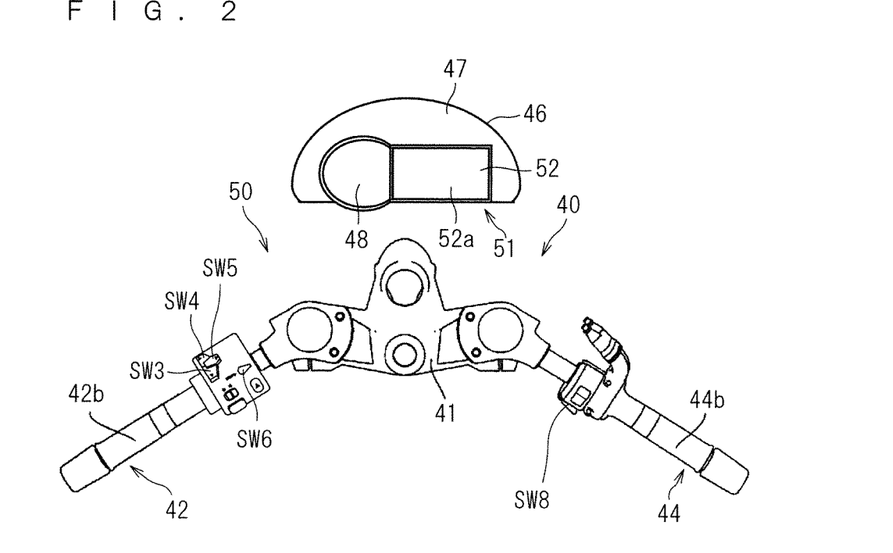
FIG. 2 is a descriptive diagram illustrating a configuration around a display device of the motorcycle.

FIG. 2 is a descriptive diagram illustrating a configuration around the display device 51 of the motorcycle 10.

The handle device 40 includes a left handlebar 42 and a right handlebar 44. In FIG. 2, the left handlebar 42 and the right handlebar 44 are supported by the upper bracket 41. Alternatively, the left handlebar 42 and the right handlebar 44 may be supported by the front fork 17.

The left handlebar 42 is equipped with a handle grip 42b. The driver drives the motorcycle while grasping the handle grip 42b.

Figure 3:
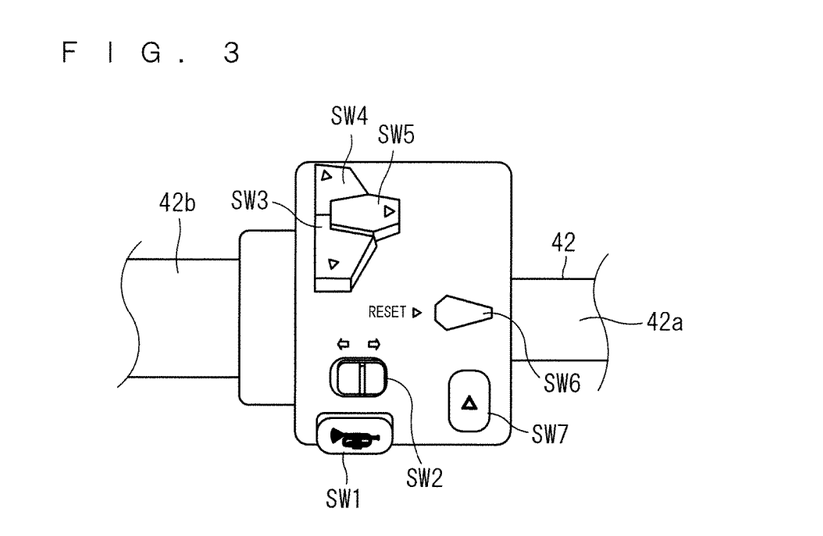
FIG. 3 is an enlarged view of switches provided on the left handlebar.

FIG. 3 is an enlarged view of switches SW1 to SW7 provided on the left handlebar 42. As illustrated in FIGS. 2 and 3, the switches SW1 to SW7 are provided inward of the handle grip 42b of the left handlebar 42 in the direction of the vehicle width.

The switches SW1 to SW7 receive various operations performed by the driver. For example, the switch SW1 is a horn switch, and the switch SW2 is a direction-indicator switch. The switches SW3 to SW5 are switches that receive operations such as an instruction to set display in the display part 52 and an instruction to set running characteristics. The switch SW6 is a reset switch, and the switch SW7 is a hazard switch. In the example described later, the switch SW6 is used as a preset switching operation input device that receives instructions to switch a display form to preset display information, which will be described later.

The switches SW1 to SW7 described above, in particular the switch SW6 used as the preset switching operation input device, are provided at positions that enable the driver to operate these switches while grasping the handle grip 42b to drive the motorcycle 10.

As illustrated in FIG. 2, a switch SW8 is provided inward of the handle grip 44b of the right handlebar 44 in the direction of the vehicle width. The switch SW8 is a function switch. As will be described later, the preset screen is set by a combination of operations to the above-described switch SW6 and the switch SW8. Note that the preset screen is a screen that is to be displayed in switching display areas 71 to 73 by operation of the preset switching operation input device, and is defined by display information associated with the switching display areas 71 to 73.

The above-described switch SW8 is provided at a position that enables the driver to operate the switch SW8 while grasping the handle grip 44b to drive the motorcycle 10.

A meter unit 46 is supported at the front of the upper bracket 41 via a bracket 47. The meter unit 46 includes a tachometer 48 and the display part 52. The tachometer 48 indicates the number of revolutions of the engine 24 per unit time, and the display part 52 displays various types of information such as vehicle speed and residual fuel as will be described later.

In the present example, the display part 52 is supported by the head pipe 12 at a position ahead of the head pipe 12 via the bracket 47 and other brackets. Thus, the display part 52 does not turn even if the handle device 40 is turned, and the position of the display part 52 relative to the body frame 11 remains unchanged. At least a display screen 52a of the display part 52 is located between the pair of handle grips 42b and 44b.

As another example, the display part may be supported by other constituent elements such as the upper bracket, the under bracket, and the front fork via brackets. In this case, if the handle device is turned, the display part also turns along with the turn of the handle device.

Figure 4:
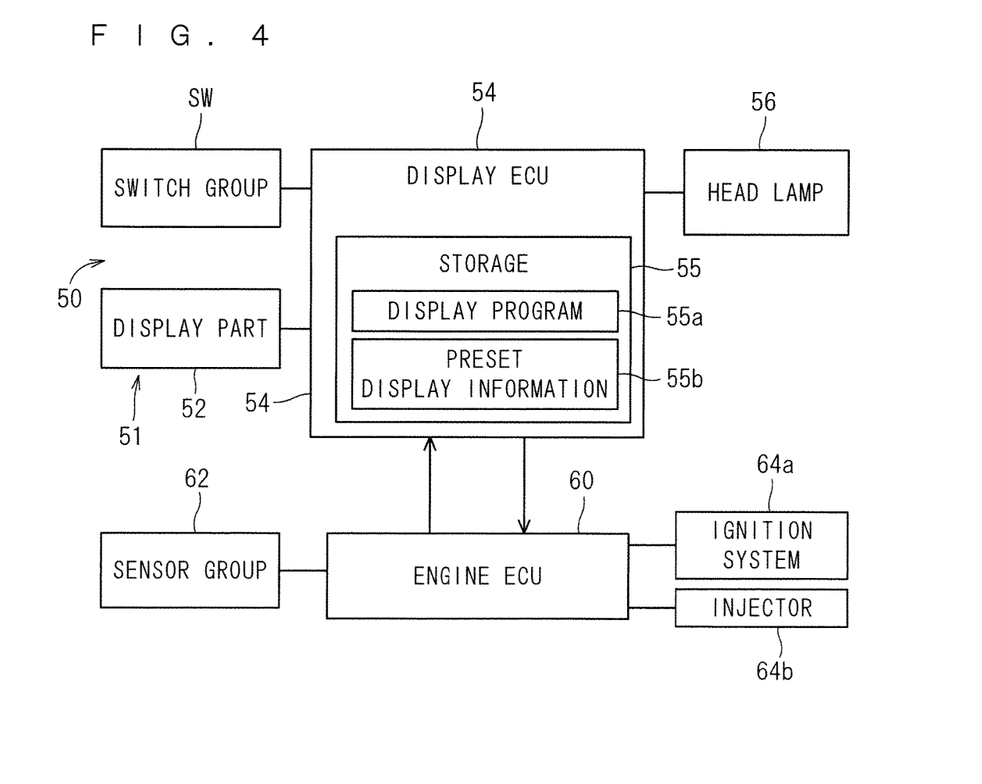
FIG. 4 is a block diagram of an electrical configuration of the motorcycle.

FIG. 4 is a block diagram of an electrical configuration of the motorcycle 10. The motorcycle 10 includes a switch group SW that includes the above-described switches SW1 to SW8, the display part 52, a display electronic control unit (ECU) 54, and an engine electronic control unit (ECU) 60.

The display ECU 54 is configured by a typical microcomputer that includes, for example, a CPU (processor), a ROM, and a RAM and performs every arithmetic operation via software programs stored in advance. The display ECU 54 stores a display program 55a and preset display information 55b in a storage unit 55 that is configured by a rewritable flash memory or the like. The display ECU 54 performs arithmetic operations in accordance with a processing procedure written in the display program 55a.

Like the display ECU 54, the engine ECU 60 is also configured by a typical microcomputer and performs various types of control while establishing communication with the above-described display ECU 54.

The display ECU 54 is connected to, for example, a head lamp 56 attached to the motorcycle 10, and the engine ECU 60 is connected to, for example, an ignition system 64a and an injector 64b. The engine ECU 60 is also connected to, for example, a sensor group 62 that is installed in the motorcycle 10 and that includes a speed sensor, an inertia measuring device, a battery voltage sensor, a water temperature sensor, an oil temperature sensor, an oil pressure sensor and so on. The inertia measuring device is a device for measuring the posture of a motorcycle including a banking angle (roll angle), and may be a device for measuring a banking angle (roll angle), a yaw angle, and a pitch angle. A motion of rotation about an axis in the forward and backward direction of the vehicle is referred to as banking (rolling), a motion of rotation about an axis in the right and left direction of the vehicle is referred to as pitching, and a motion of rotation about an axis in the up and down direction of the vehicle is referred to as yawing. The rotation angles of banking, pitching, and yawing from the initial posture of the motorcycle 10 when placed vertically to the ground are respectively referred to as a banking angle (roll angle), a yaw angle, and a pitch angle.

The display ECU 54 and the engine ECU 60 perform various types of control such as control of display part 52 and its vicinities and control of the engine 24 in cooperation with each other on the basis of various instructions from the switch group SW and various outputs from the sensor group 62.

Ordinarily, the display ECU 54 performs various types of control of the display part 52 and its vicinities, and the engine ECU 60 performs control of the engine 24. Of course, the display ECU 54 and the engine ECU 60 may perform any control described above. The switch group SW, the sensor group 62, and the driving parts such as the lamp 56, the ignition system 64a, and the injector 64b described above may be connected to either the display ECU 54 or the engine ECU 60. In any case, various outputs from the sensor group 62 are directly or indirectly input to the display ECU 54, and therefore the display part 52 is capable of displaying information such as distance traveled, banking angle, fuel consumption, average speed, battery voltage, and water temperature as will be described later. If the engine 24 includes a supercharger, the display part 52 may also display a boost pressure that is a supercharged pressure of the supercharger, and a boost temperature that is a temperature of supercharged compressed air of the supercharger. The above-described control may be implemented by a single ECU, or may be distributed and performed by three or more ECUs.

The display device 50 for a saddle-type vehicle includes a display-form change operation input device, a preset switching operation input device that receives an operation for switching a display form to a preset screen that has been set in advance, and the vehicle-information display device 51. The vehicle-information display device 51 displays information about the motorcycle 10 to enable the driver to recognize the information, and includes the display part 52. The display form of the display part 52 is controlled by the display ECU 54. The display part 52 and the display ECU 54 may be provided as an integral unit, or may be provided separately.

The display part 52 is configured by a dot matrix display device such as a liquid crystal display device or an organic electroluminescence (EL) display device, and preferably, configured by a flat panel display device. The display form of the display screen 52a of display part 52 can be set in accordance with a driver's operation for changing a display form. If the driver performs an operation for switching a display form to the preset screen while the display form has been set, the display form of the display screen 52a can be switched to a predetermined preset screen. The display form as used herein includes at least one of a kind of display content in a predetermined area of the display screen and a position of display information. Thus, one example of changing the display form is changing the kind of display content in a predetermined area, and one example of switching the display form to the preset screen is changing the kind of display content to a preset kind. Another example of changing the display form is changing the position of a given piece of display information, and another example of switching the display form to the preset screen is switching the position of a given piece of display information to a preset position. The former examples will be primarily described herein. The term "preset" as used herein refers to a driver's operation for previously setting the display form of the preset screen described above.

Figure 5:
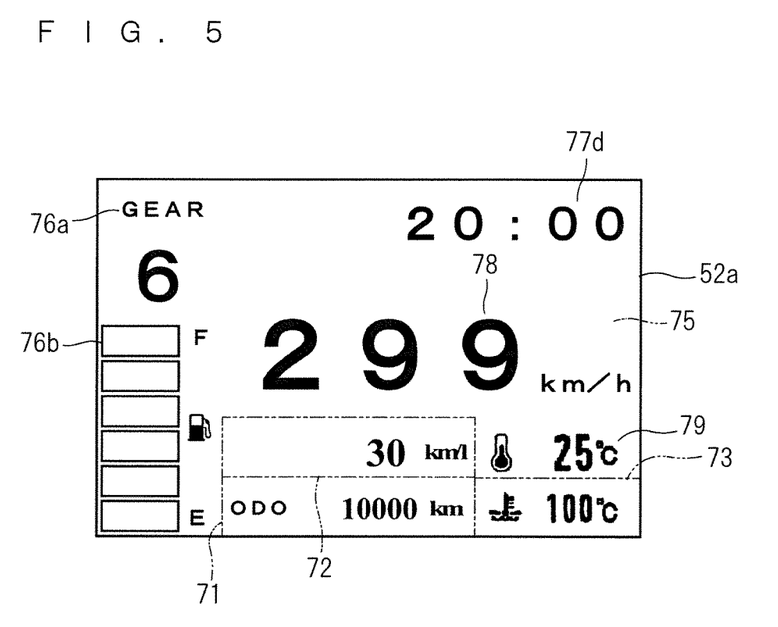
FIG. 5 shows an exemplary display form of a display part.

FIG. 5 illustrates an exemplary display form of the display part 52. The display screen 52a of the display part 52 includes a first switching display area 71, a second switching display area 72, a third switching display area 73, and a non-switching display area 75. The first switching display area 71, the second switching display area 72, and the third switching display area 73 are areas where display information is switched and displayed upon receipt of a driver's operation for changing a display form. The driver is able to individually set the display forms of the plurality of switching display areas 71 to 73 by performing operations for changing a display form individually on the first switching display area 71, the second switching display area 72, and the third switching display area 73.

The first switching display area 71, the second switching display area 72, and the third switching display area 73 are also areas where the display information is switched to the preset display information that has been set for the preset screen, upon receipt of a driver's operation for switching the display form to the preset screen.

That is, if the driver performs an operation for switching the display form to the preset screen while the driver has individually set the display forms of the plurality of switching display areas 71 to 73, the display contents of the switching display areas 71 to 73 are switched at a time to preset display information that corresponds to each of the switching display areas 71 to 73.

The preset display information for the preset screen has been set at an early stage, such as the stage of factory shipping, and the driver is able to change the settings.

An example of the switchable display information in the first switching display area 71, the second switching display area 72, and the third switching display area 73, an example of the preset display information set for the preset screen, and an example of each driver's operation will be described later.

The non-switching display area 75 is an area where fixed display information is continuously displayed. In the present example, the area other than the areas that are set as the first switching display area 71, the second switching display area 72, and the third switching display area 73, out of the entire area of the display screen 52a, is referred to as the non-switching display area 75. The non-switching display area 75 includes a gear display part 76a that is displayed on the left of the display screen 52a, a residual fuel display part 76b, a clock display part 77d, a speed display part 78 that is displayed in the center of the display screen 52a, and an outside temperature display part 79 that is displayed below the speed display part 78 on the right of the display screen 52. Continuously displaying fixed information as used herein refers to continuing to display the display information without changing the kind of display information.

The screen displayed in the display part 52 may be monochrome or may be colored. In the case of monochrome display, the screen may be switched between a daytime mode in which black characters or patterns are displayed on a white background and a nighttime mode in which white characters or patterns are displayed on a black background, by a manual operation or depending on the time of day or the result of detection of an illumination sensor.

Figure 6:
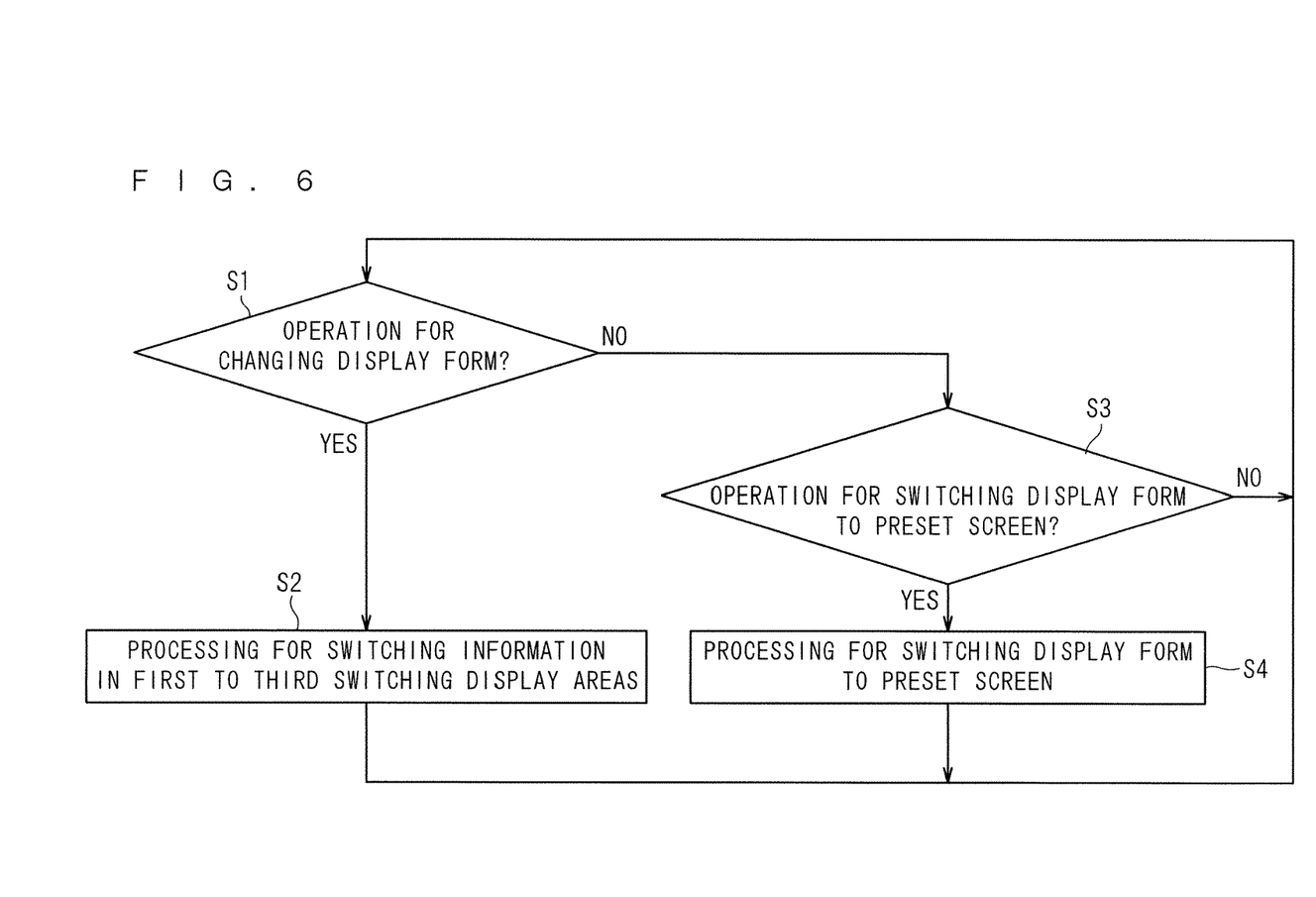
FIG. 6 is a flowchart illustrating an example of processing for controlling display information in each switching display area.

FIG. 6 is a flowchart illustrating an example of processing for controlling display information in the first switching display area 71, the second switching display area 72, and the third switching display area 73, among processing performed by the display ECU 54 to control the display information in the display part 52.

First, in step S1, the display ECU 54 determines whether the driver has performed an operation for changing a display form. If it is determined that the driver has performed an operation for changing a display form, the procedure proceeds to step S2.

In step S2, the display ECU 54 performs processing for switching the display form in the first to third switching display areas 71 to 73 in accordance with the operation for changing the display form. Accordingly, information desired by the driver is displayed in the first to third switching display areas 71 to 73.

If it is determined in step S1 that the driver has not performed an operation for changing a display form, the procedure proceeds to step S3.

In step S3, the display ECU 54 determines whether the driver has performed an operation for switching a display form to the preset screen. If it is determined that the driver has performed an operation for switching a display form to the preset screen, the procedure proceeds to step S4.

In step S4, the display ECU 54 switches the display contents of the plurality of switching display areas 71 to 73 at a time to preset display information that corresponds to each switching display area. Accordingly, the preset display information is displayed at a time in the first to third switching display areas 71 to 73.

If it is determined in step S3 that the driver has not performed an operation for switching a display form to the preset screen, the procedure returns to step S1 and the processing described above is repeated.

The above-described processing is merely one example, and other processing may be inserted, for example.

An example of the switchable display information in the first switching display area 71, the second switching display area 72, and the third switching display area 73, an example of the preset display information set for the preset screen, and an example of each driver's operation will now be described more specifically by using the display screen 52a illustrated in FIG. 5 as an example. For example, various types of switches capable of receiving driver's operations are conceivable as the display-form change operation input device that receives an operation for changing a display form and as the preset switching operation input device that receives an operation for switching a display form to the preset screen. The present example describes a case in which the switches SW3 to SW5 serve as the display-form change operation input device that receives an operation for changing the display forms of the first switching display area 71, the second switching display area 72, and the third switching display area 73, and the switch SW6 serves as the preset switching operation input device that receives an operation for switching a display form to the preset screen that has been set in advance.

Figure 7:
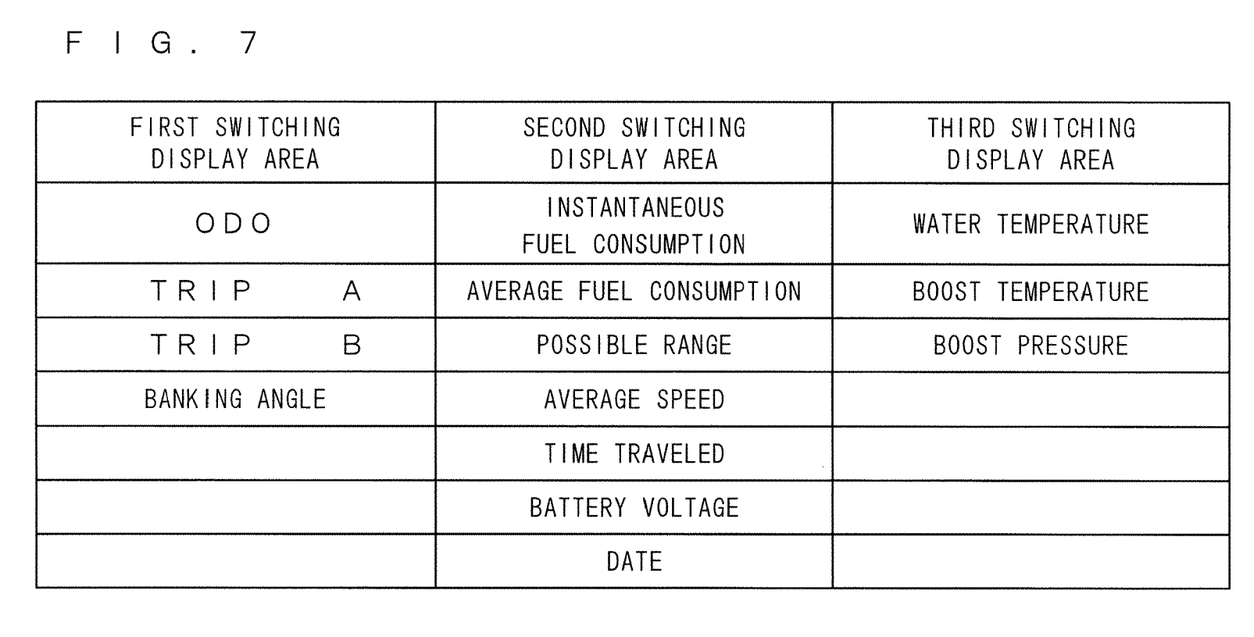
FIG. 7 illustrates an example of the kinds and sequence of display information allocated to each switching display area.

First, the kinds and sequence of display information are assumed to have been set for each of the first switching display area 71, the second switching display area 72, and the third switching display area 73 as illustrated in FIG. 7. In the present example, information relating to distance such as "ODO," "TRIP A," and "TRIP B" and information about "banking angle" are allocated in this order to the first switching display area 71. Also, various types of information such as "instantaneous fuel consumption," "average fuel consumption," "possible range," "average speed," "time traveled," "battery voltage," and "date" are allocated in this order to the second switching display area 72, and information regarding "water temperature," "boost temperature," and "boost pressure" are allocated in this order to the third switching display area 73. Note that at least one of the first switching display area 71, the second switching display area 72, and the third switching display area 73 may be set to display blanks, and in this case, blanks may be displayed as information in that display area. In the present example, display information is exclusively allocated to the first switching display area 71, the second switching display area 72, and the third switching display area 73. The above-described allocation of the kinds and sequence of display information to each display area is merely one example, and the number of kinds of display information may be increased or reduced, and the sequence and combination of display information may be arbitrarily changed.

Figure 8:
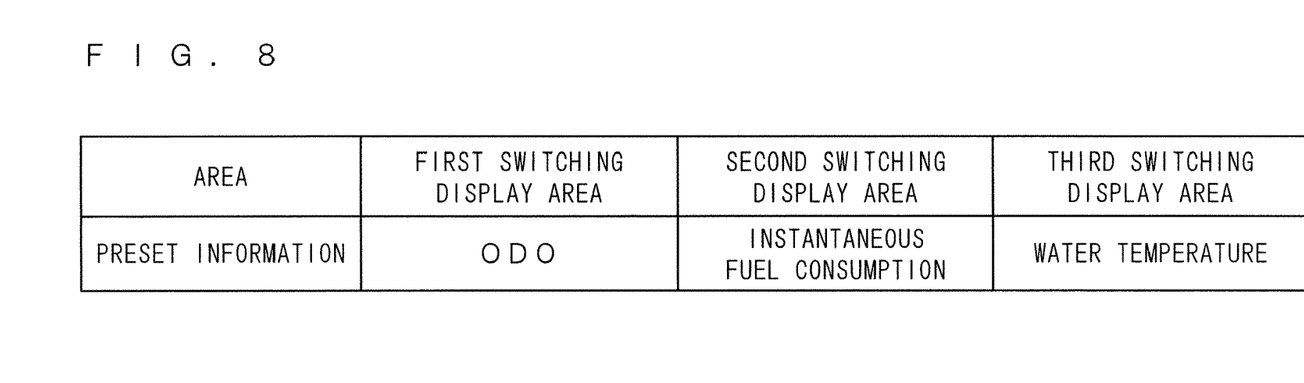
FIG. 8 illustrates an example of preset display information that is set as a preset screen.

The preset display information is set in advance as a preset screen as illustrated in FIG. 8. One kind of display information that can be displayed is allocated to each of the first switching display area 71, the second switching display area 72, and the third switching display area 73 as illustrated in FIG. 8.

In the example illustrated in FIG. 8, for example, "ODO" is set for the first switching display area 71, "instantaneous fuel consumption" is set for the second switching display area 72, and "water temperature" is set for the third switching display area 73 as the preset display information. As described previously, the preset display information is set in an early stage such as the stage of factory shipping, and the driver is able to change the settings of the preset display information.

Figure 9:
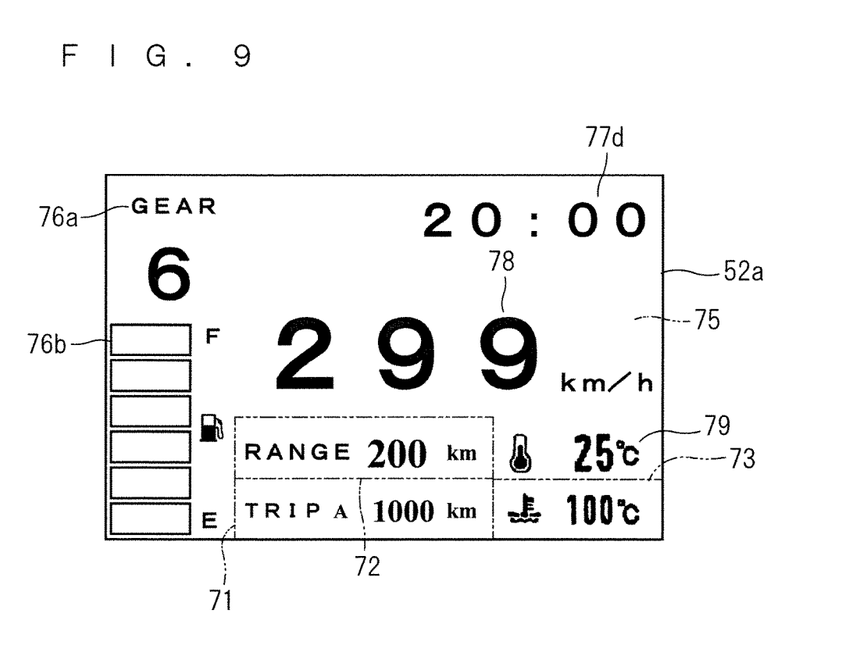
FIG. 9 shows another exemplary display form of the display part.

When the driver has operated the switches SW3 to SW5 as operations for changing a display form, these operations are received. For example, it is assumed that information about "ODO" is displayed in the first switching display area 71, information about "instantaneous fuel consumption" (30 km/l) is displayed in the second switching display area 72, and information about "water temperature" (100° C.) is displayed in the third switching display area 73 as illustrated in FIG. 5. In this state, with each short press of one of the switches SW3 to SW5 by the driver, the display information in the corresponding one of the first switching display area 71, the second switching display area 72, and the third switching display area 73 is sequentially switched in the predetermined order (see FIG. 7). For example, with a single short press of the switch SW3 by the driver, the display information in the first switching display area 71 that corresponds to the switch SW3 is switched from the display information being displayed to the next display information in the predetermined order (see FIG. 7), i.e., switched to the information about "TRIP A" as illustrated in FIG. 9. A short-press of a switch as used herein refers to a press of the switch for not more than or less than a predetermined period of time that has been set in advance. With two or three or more presses of the switch SW3 by the driver, the display information in the first switching display area 71 is switched in the predetermined order (see FIG. 7). Similarly, with two presses of the switch SW4 by the driver, the display information in the second switching display area 72 that corresponds to the switch SW4 is switched twice from "instantaneous fuel consumption" being displayed, i.e., switched to the information about "possible range" (RANGE 200 km) as illustrated in FIG. 9. Similarly, with a desired number of presses of the switch SW5 by the driver, the display information in the third switching display area 73 that corresponds to the switch SW5 is switched in the same manner in the predetermined order (see FIG. 7). Accordingly, the display form of the vehicle-information display device 51 is set.

In this state of settings, if the driver has operated the switch SW6 as an operation for switching a display form to the preset screen, this switching operation is received. In response to this, the vehicle-information display device 51 switches its display form to the preset screen. In the present example, the switch SW6 is shortly pressed by the driver. Upon this press, the vehicle-information display device 51 switches the display information in each of the switching display areas 71 to 73 to the preset display information. More specifically, information about "ODO" is displayed in the first switching display area 71, information about "instantaneous fuel consumption" is displayed in the second switching display area 72, and information about "water temperature" is displayed in the third switching display area 73 (see FIG. 5) in accordance with the preset display information illustrated in FIG. 8.

The driver is also able to set a preset screen for the vehicle-information display device 51. An example of setting the preset screen will now be described.

As described above, when an operation for changing a display form has been received via the switches SW3 to SW5, which are examples of the display-form change operation input device, the vehicle-information display device 51 becomes capable of setting the display form of the vehicle-information display device 51 in accordance with the received operation. The display form set in this way can be set as a preset screen by a driver's operation.

More specifically, as described above, the driver performs an operation for changing a display form via the switches SW3 to SW5, which are examples of the display-form change operation input device. Accordingly, the display form of the vehicle-information display device 51 is set to a desired content that is dependent on the driver's operation. For example, the display information in the first to third switching display areas 71 to 73 is switched from the one illustrated in FIG. 5 to the one illustrated in FIG. 9.

In this state, if the driver has performed an operation for setting the preset screen, the display information being displayed in each of the first switching display area 71, the second switching display area 72, and the third switching display area 73 is stored as updated preset display information 55b in the storage unit 55.

The driver's operation for setting the preset screen may be any type of operation, and one conceivable example is a simultaneous long press of the switches SW6 and SW8. The switches SW6 and SW8 are separately provided respectively on the left and right handlebars 42 and 44, and additionally a long press of each of the switches SW6 and SW8 is required. This avoids operation mistakes and unintended registration of the preset display information. A long press of a switch as used herein refers to a press of the switch for not less than or more than a predetermined period of time that has been set in advance.

For example, the preset display information 55b is assumed to be set such that "ODO" is set for the first switching display area 71, "instantaneous fuel consumption" is set for the second switching display area 72, and "water temperature" is set for the third switching display area 73 (see FIG. 8). In this case, a case is assumed in which the driver has performed an operation for switching a display form, and accordingly, information about "TRIP A" is displayed in the first switching display area 71, information about "possible range" (RANGE) is displayed in the second switching display area 72, and information about "water temperature" is displayed in the third switching display area 73. In this state, if the driver has performed an operation for setting the preset screen, the preset display information 55b is newly set in accordance with the display information being displayed such that "TRIP A" is set for the first switching display area 71, "possible range" (RANGE) is set for the second switching display area 72, and "water temperature" is set for the third switching display area 73.

Note that the above-described switching operations such as receiving processing for switching each of the switching display areas 71 to 73, receiving registration of the preset display information, and receiving an operation for switching a display form to the preset screen are merely one example.

For example, in the case of switching the display information in the switching display areas 71 to 73, a target area to be switched in the switching display areas 71 to 73 may be switched with a short press of the switch SW5, display information may be switched in the forward direction with a short press of the switch SW3, and display information may be switched in the backward direction with a short press of the switch SW4. As another alternative, display information in the switching display areas 71 to 73 may be switched by using any one of the switches. One example is that a long press of any one of the switches causes the current mode to transition to a mode of switching display information and causes one of the switching display areas 71 to 73 to flash on and off; a further short press of the same single switch in this state causes display information to be switched in accordance with the number of short presses; and a further long press of the same single switch in this state causes the other one of the switching display areas 71 to 73 to flash on and off and causes display information to be switched in the same manner.

The switching to the preset screen and the setting and registration of the preset display information may be implemented by operations to any operating input device.

According to the motorcycle 10 and the display device for a motorcycle having the above-described configuration, the display form of the vehicle-information display device 51 can be set via the display-form change operation input device. After the display form has been set, the display form of the vehicle-information display device 51 can be switched to the preset screen that has been set in advance, by an operation that is as simple as possible, such as operating the preset switching operation input device.

In particular, the function of switching the display information in the plurality of switching display areas 71 to 73 is allocated to the switches SW3 to SW5 serving as the display-form change operation input device, and the function of switching a display form to the preset screen is allocated to the switch SW6 serving as the preset switching operation input device different from the display-form change operation input device. Thus, the driver rarely makes an error when performing operations to the preset screen.

By separating information about the motorcycle 10 into information that is displayed in the switching display areas 71 to 73 and information that is displayed in the non-switching display area 75, display information that always needs to be displayed can be displayed in the non-switching display area 75, and information that only needs to be displayed as necessary can be displayed in the switching display areas 71 to 73. This allows the vehicle-information display device 51 of the motorcycle 10, for which it is difficult to set a large display area, to easily and clearly display a large number of pieces of information.

The display contents of the plurality of switching display areas 71 to 73 can be switched at a time to the preset display information by one operation to the switch SW6, which serves as a single preset switching operation input device. That is, the switching can be performed smoothly.

Because the driver is able to set the preset display information, it is possible for the driver to immediately display information convenient for the driver.

The switch SW6 serving as the preset switching operation input device is provided at a position that enables the driver to operate the switch SW6 while grasping the handle grip 42*b*. This is convenient for the driver to change the display form to the preset screen while grasping the handle grip 42*b*.

The switch SW6 may be provided on the left handle grip 42*b*, or may be provided on the right handle grip 44*b*. Ordinarily, the right handle grip 44*b* is used for a throttle operation, and the left handle grip 42*b* is not used for such an operation. Thus, it is easier for the driver to operate the switch SW6 provided on the left handle grip 42B.

Display information that is displayed in the first switching display area 71 includes display information about the banking angle. If the display information about the banking angle is included as information that can be selectively displayed in the first switching display area 71, the user is able to check the numerical value of the banking angle as necessary.

The above embodiment describes a case in which the display screen 52*a* of the vehicle-information display device 51 is located between the pair of handle grips 42*b* and 44*b*, and the switches SW3 to SW5 serving as the display-form change operation input device and the switch SW6 serving as the preset switching operation input device are located toward either of the pair of handle grips 42*b* and 44*b* with respect to the display screen 52*a* of the vehicle-information display device 51. In the present example, the switches SW3 to SW6 are provided inward of the left handle grip 42*b*. This configuration enables the driver to easily change the display form of the vehicle-information display device 51 by operating the switches SW3 to SW6 provided toward either of the handle grip 42*b* and 44*b* while visually identifying the vehicle-information display device 51 provided at a position toward the center of the handlebar 42.

The above-described vehicle-information display device 51 may be configured to be capable of selectively setting one of a plurality of display modes.

Figure 10:
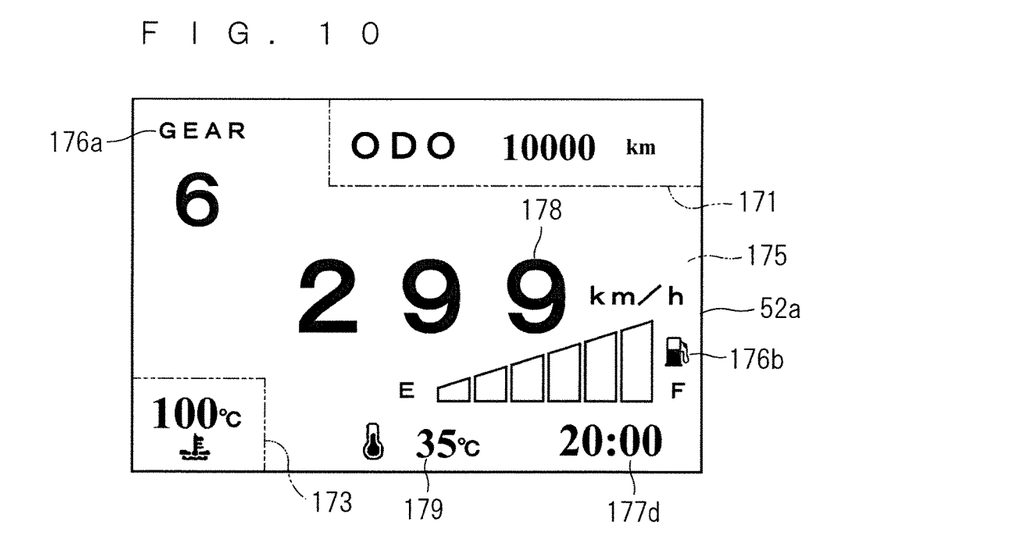
FIG. 10 shows an example of display in a second display mode.

Assuming that the example of display illustrated in FIG. 5 is a first display mode, FIG. 10 illustrates an example of a second display mode. In FIG. 10, the display screen 52*a* of the display part 52 includes a first switching display area 171, a third switching display area 173, and a non-switching display area 175.

The first switching display area 171 is an area that corresponds to the above-described first switching display area 71 and displays the same content of information as that displayed in the first switching display area 71. In the present example, the first switching display area 171 is set as a horizontal rectangular area that is located at a position on the upper right of the display screen 52*a* as viewed from the center.

The third switching display area 173 is an area that corresponds to the third switching display area 73 and displays the same content of information as that displayed in the third switching display area 73. In the present example, the third switching display area 173 is set as a horizontal rectangular area that is located at a position on the lower left of the display screen 52*a*.

The second switching display area 72 is not provided in the present example.

The non-switching display area 175 is an area where fixed display information is continuously displayed. In the present example, the area other than the areas that are set as the first switching display area 171 and the third switching display area 173, out of the entire area of the display screen 52*a*, is referred to as the non-switching display area 175. The non-switching display area 175 includes a gear display part 176*a* that is displayed on the left of the display screen 52*a*, a speed display part 178 that is displayed in the center of the display screen 52*a*, a residual fuel display part 176*b* that is displayed on the lower right of the speed display part 178, a clock display part 177*d* that is displayed in the lower part of the display screen 52*a*, and an outside temperature display part 179.

Alternatively, the first display mode and the second display mode may be modes that are simply different in design from each other and that enable the driver to switch the mode by preference. As another alternative, the first display mode and the second display mode may be modes that differ in at least one of features such as the number of pieces of display information displayed in the non-switching display area (75, 175), the kinds of display information, and the layout of display information, and in addition to or instead of this difference, that differ in at least one of features such as the number of switching display areas (71 to 73, 171, 173), the content of display, and the layout of display and that can be switched according to the operation status.

Figure 11:
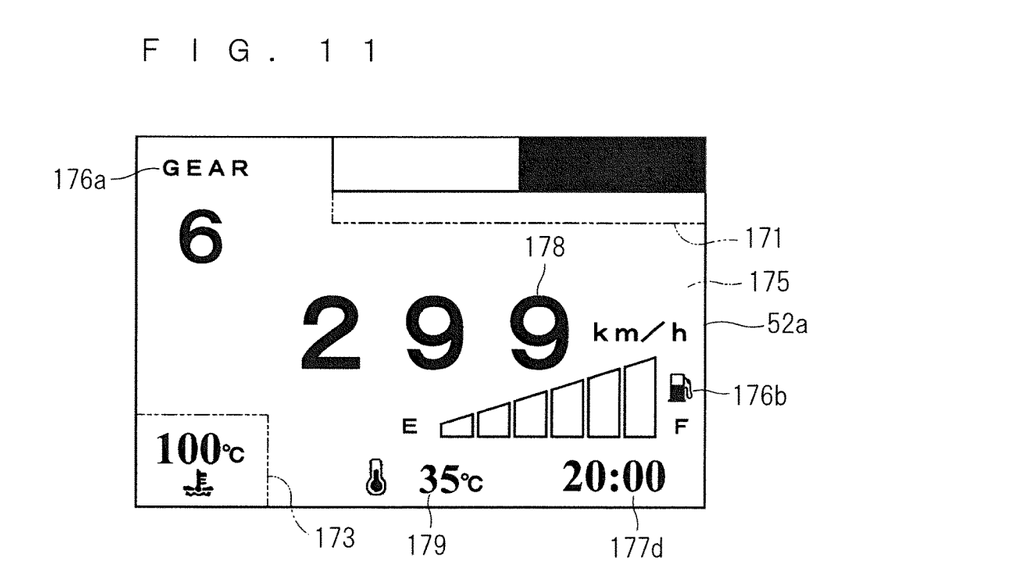
FIG. 11 shows another example of display in the second display mode.

In the second display mode as well, the display information in the first switching display area 171 and the third switching display area 173 can be switched in accordance with a driver's switching operation in the same manner as described in the above embodiment. For example, the switches SW3 and SW5 may be used as switching operation input devices, and display information may be switched by operating these switches. For example, as illustrated in FIG. 11, the banking angle may be displayed in the first switching display area 171 by operating the switch SW3. The display information in the first switching display area 171 and the third switching display area 173 can be registered as preset display information by a driver's operation for setting and registering a preset screen (e.g., with a simultaneous press of the switches SW6 and SW8) as in the above-described embodiment. Moreover, the display information in the first switching display area 171 and the third switching display area 173 can be switched to the preset display information by a driver's operation for switching a display form to the preset screen (e.g., operation to the switch SW6). In this case, the preset display information set in the first display mode is used as preset display information to which the display information is switched, although the display information in the second switching display area 72 cannot be displayed.

Thus, it is possible to maintain the preset display information that has been set as the preset screen for the switching display areas 71 to 73, 171, and 174, even if the mode has been changed between the first display mode and the second display mode.

Note that the vehicle-information display device 51 may be configured to be capable of selecting one of three or more display modes. In this case, common settings of the preset screen may be applied to each display mode.

While the above-described embodiment describes an example in which the switches SW3 to SW5 provided in the vicinity of the handle grip 42*b* serve as the switching operation input device, and the switch SW6 provided in the vicinity of the handle grip 42*b* serves as the preset switching operation input device. At least one of these switches may be provided in the vicinity of the handle grip 44*b*, or may be provided in the vicinity of the display part 52. Alternatively, the display part 52 itself may be a touch screen capable of receiving touch operations, and this touch screen itself may be used as the switching operation input device or the preset switching operation input device.

While the above embodiment describes a case where the first switching display area 71, the second switching display area 72, and the third switching display area 73 are present, there may be only one switching display area. Of course, in the case where there are a plurality of switching display areas, receiving an operation for switching a display form to the preset screen via the preset switching operation input device is effective because information in the plurality of switching display areas can be switched at a time to the preset display information that has been set for the preset screen. Even in the case where there is only one switching display area, if it is assumed that the switching display area has three or more kinds of switchable display information, it becomes necessary to operate a switching operation input device multiple times in order to switch the display information to desired display information. Even in such a case, receiving an operation for switching a display form to the preset screen via the preset switching operation input device is effective because it is possible to reduce the number of operations required to switch the display information to the preset display information that has been set for the preset screen.

The configurations described in the embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

As described above, the specification of the present invention includes each aspect of the invention described below.

A first aspect is directed to a display device for a saddle-type vehicle. The display device for a saddle-type vehicle includes a display-form change operation input device that receives an operation for changing a display form, a preset switching operation input device that receives an operation for switching a display form to a preset screen that has been set in advance, and a vehicle-information display device that displays information about a saddle-type vehicle to enable a driver to recognize the information. A display form of the vehicle-information display device is set in accordance with an operation for changing a display form received via the display-form change operation input device, and if an operation for switching a display form to the preset screen is received via the preset switching operation input device while the display form of the vehicle-information display device has been set, the display form of the vehicle-information display device is switched to the preset screen.

With this configuration, the display form of the vehicle-information display device can be set via the display-form change operation input device. In addition, after the display form of the vehicle-information display device has been set, the display form of the vehicle-information display device can be switched to the preset screen that has been set in advance, by an operation that is as simple as possible, such as operating the preset switching operation input device different from the display-form change operation input device. This enables the driver to switch the display information by a simple operation.

A second aspect is directed to the display device for a saddle-type vehicle according to the first aspect. The vehicle-information display device includes a switching display area and a non-switching display area, the switching display area being a display area where display information is switched and displayed upon receipt of an operation for changing a display form via the display-form change operation input device, and the non-switching display area being a display area where fixed display information is continuously displayed. Upon receipt of an operation for switching a display form to the preset screen via the preset switching operation input device, the vehicle-information display device switches display information displayed in the switching display area to preset display information that has been set for the preset screen.

With this display device, by separating information about the saddle-type vehicle into information that is displayed in the switching display area and information that is displayed in the non-switching display area, display information that always needs to be displayed can be displayed in the non-switching display area, and display information that only needs to be displayed as necessary can be displayed in the switching display area. This allows the vehicle-information display device of the saddle-type vehicle, for which it is difficult to set a large display area, to easily and clearly display a large number of pieces of information.

A third aspect is directed to the display device for a saddle-type vehicle according to the second aspect. The vehicle-information display device includes a plurality of switching display areas, each being the switching display area. Display forms of the plurality of switching display areas are set individually in accordance with operations for changing a display form received via the display-form change operation input device, and if an operation for switching a display form to the preset screen is received via the preset switching operation input device that is a single operation input device while the display forms of the plurality of switching display areas have been set individually, display contents of the plurality of switching display areas are switched to the preset display information that corresponds to each of the plurality of switching display areas.

With this display device, the display contents of the plurality of switching display areas can be switched at a time to the preset display information by operating a single preset switching operation input device.

A fourth aspect is directed to the display device for a saddle-type vehicle according to any one of the first to third aspects. If an operation for switching a display form to the preset screen is received via the preset switching operation input device while the display form of the vehicle-information display device has been set, a screen that is set by the driver is displayed as the preset screen.

This display device enables the driver to immediately display information convenient for the driver.

A fifth aspect is directed to the display device for a saddle-type vehicle according to the fourth aspect. The vehicle-information display device is capable of selectively displaying one of a plurality of display modes. A setting of the preset screen that has been set by the driver is applied as a common setting to the plurality of display modes. With one of the plurality of display modes being selectively displayed, the display form of the vehicle-information display device is set in accordance with an operation for changing a display form received via the display-form change operation input device, and if an operation for switching a display form to the preset screen is received via the preset switching operation input device while the display form of the vehicle-information display device has been set, the display form of the vehicle-information display device is switched to the preset screen in accordance with the display mode being displayed.

With this display device, it is possible to maintain the preset screen that has been set for the non-display area, even if the mode has been changed.

A sixth aspect is directed to the display device for a saddle-type vehicle according to any one of the first to fifth aspects. The preset switching operation input device is provided at a position that enables the driver to operate the preset switching operation input device while grasping a handle grip to drive a saddle-type vehicle.

This display device enables the driver to change the preset screen while grasping the handle grip.

A seventh aspect is directed to the display device for a saddle-type vehicle according to any one of the first to sixth aspects. The vehicle-information display device includes display information about a banking angle as one piece of display information that is displayed while changing at least part of a display form.

An eighth aspect is directed to a saddle-type vehicle that includes a handlebar equipped with a pair of handle grips on opposite sides of the handlebar, the handle grips being grasped by a driver to drive the saddle-type vehicle. The display device for a saddle-type vehicle according to any one of the first to seventh aspects is assembled into the saddle-type vehicle in such a form that a display screen of the vehicle-information display device is located between the pair of handle grips, and the display-form change operation input device and the preset switching operation input device are located toward either of the pair of handle grips with respect to the vehicle-information display device.

This configuration enables the driver to easily change the display form of the vehicle-information display device by operating either the display-form change operation input device or the preset switching operation input device provided toward the handle grip while visually identifying the vehicle-information display device provided at a position toward the center of the handlebar.

What is claimed is:

1. A display device for a saddle-type vehicle, comprising:
a display-form change operation input device that receives an operation for changing a display form;
a preset switching operation input device that receives an operation for switching a display form to a preset screen; and
a vehicle-information display device that displays information about a saddle-type vehicle to enable a driver to recognize the information,
wherein a display form of said vehicle-information display device is set in accordance with an operation for changing a display form received via said display-form change operation input device, and if an operation for switching a display form to the preset screen is received via said preset switching operation input device after the display form of said vehicle-information display device is set, the display form of said vehicle-information display device is switched to said preset screen.

2. The display device for a saddle-type vehicle according to claim 1, wherein
said vehicle-information display device includes a switching display area and a non-switching display area, said switching display area being a display area where display information is switched and displayed upon receipt of an operation for changing a display form via said display-form change operation input device, and said non-switching display area being a display area where fixed display information is continuously displayed, and
upon receipt of an operation for switching a display form to said preset screen via said preset switching operation input device, said vehicle-information display device switches display information displayed in said switching display area to preset display information that has been set for said preset screen.

3. The display device for a saddle-type vehicle according to claim 2, wherein
said vehicle-information display device includes a plurality of said switching display areas, and
display forms of said plurality of said switching display areas are set individually in accordance with operations for changing a display form received via said display-form change operation input device, and if an operation for switching a display form to said preset screen is received via said preset switching operation input device that is a single operation input device after the display forms of said plurality of said switching display areas are set individually, display contents of said plurality of said switching display areas are switched to said preset display information that corresponds to each of said plurality of said switching display areas.

4. The display device for a saddle-type vehicle according to claim 1, wherein
if an operation for switching a display form to the preset screen is received via said preset switching operation input device after the display form of said vehicle-information display device is set, a screen that is set by the driver is displayed as said preset screen.

5. The display device for a saddle-type vehicle according to claim 4, wherein
said vehicle-information display device is capable of selectively displaying one of a plurality of display modes,
a setting of said preset screen that has been set by the driver is applied as a common setting to said plurality of display modes, and
with one of said plurality of display modes being selectively displayed, the display form of said vehicle-information display device is set in accordance with an operation for changing a display form received via said display-form change operation input device, and if an operation for switching a display form to the preset screen is received via said preset switching operation input device after the display form of said vehicle-information display device is set, the display form of said vehicle-information display device is switched to said preset screen in accordance with said display mode being displayed.

6. The display device for a saddle-type vehicle according to claim 1, wherein
said preset switching operation input device is provided at a position that enables the driver to operate said preset switching operation input device while grasping a handle grip to drive the saddle-type vehicle.

7. The display device for the saddle-type vehicle according to claim 1, wherein
said vehicle-information display device includes display information about a banking angle as one piece of display information that is displayed at least one of (i) before, or (ii) after changing at least part of a display form.

8. A saddle-type vehicle comprising:
a handlebar equipped with a pair of handle grips on opposite sides of the handlebar, the handle grips being grasped by a driver to drive the saddle-type vehicle,
wherein the display device for a saddle-type vehicle according to claim 1 is assembled into the saddle-type vehicle in such a form that a display screen of said vehicle-information display device is located between said pair of handle grips, and said display-form change operation input device and said preset switching operation input device are located toward either of said pair of handle grips with respect to said vehicle-information display device.

* * * * *